March 25, 1958   S. NOODLEMAN   2,828,457
MOTOR CONTROL
Filed April 5, 1954   2 Sheets-Sheet 1
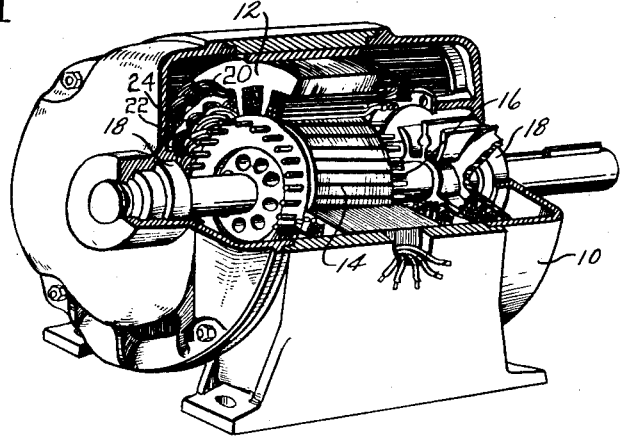
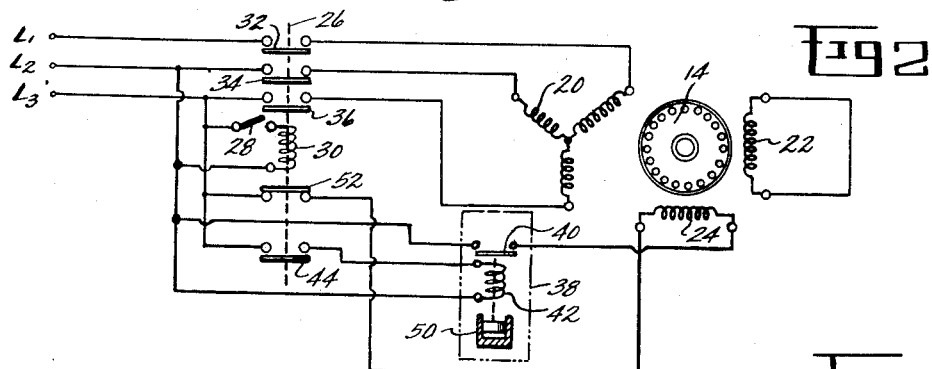
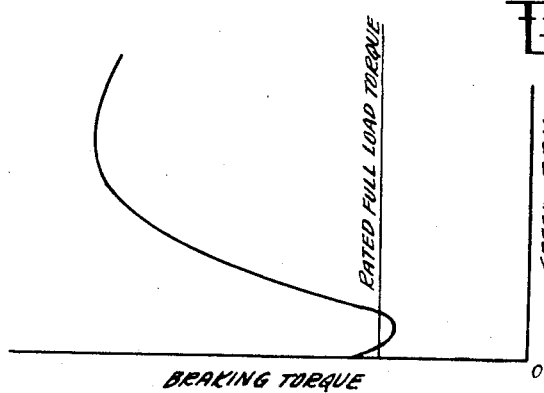
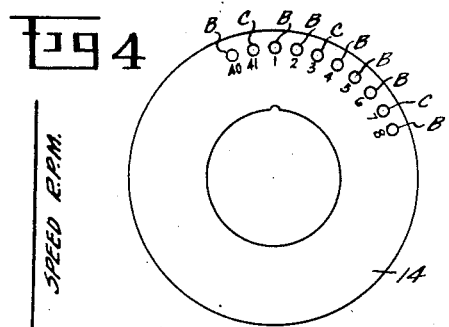
INVENTOR.
SAMUEL NOODLEMAN
BY
HIS ATTORNEYS—

March 25, 1958     S. NOODLEMAN     2,828,457
MOTOR CONTROL
Filed April 5, 1954     2 Sheets-Sheet 2
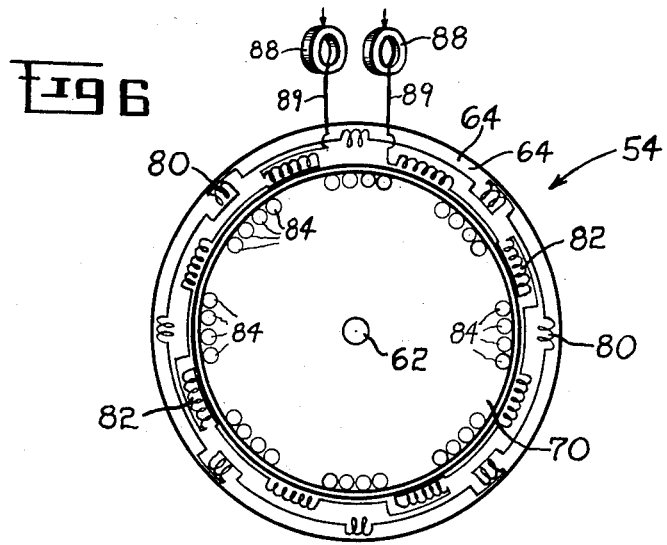
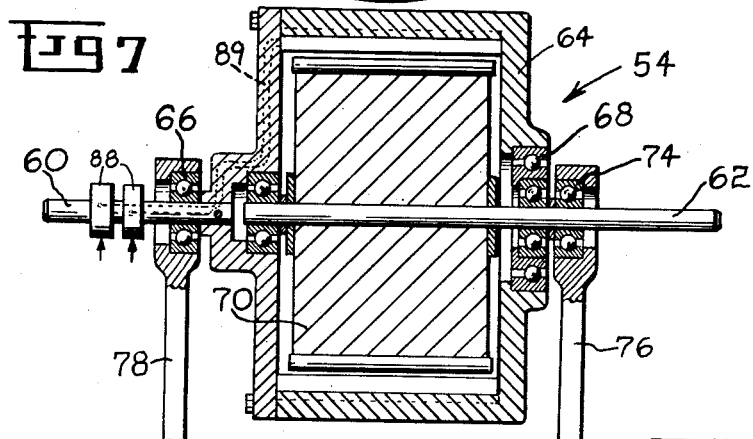
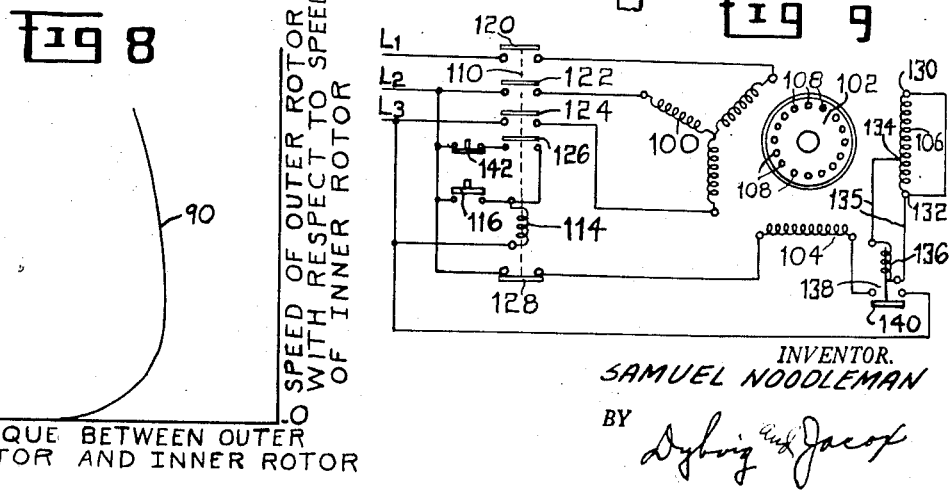
INVENTOR.
SAMUEL NOODLEMAN
BY
HIS ATTORNEYS United States Patent Office 2,828,457
Patented Mar. 25, 1958

2,828,457

MOTOR CONTROL

Samuel Noodleman, Dayton, Ohio, assignor to Louis R. Mahrt and D. Robert Laughter, as trustees for The Standard Dayton Corporation, Dayton, Ohio, a corporation of Ohio Application April 5, 1954, Serial No. 420,935

15 Claims. (Cl. 318—211)

This invention relates to a motor control and more particularly to a control for use in applying a braking effect to a motor. This invention relates to my invention disclosed in Patent No. 2,627,059.

It is an object of this invention to provide a motor which is capable of rapid deceleration.

It is a further object of this invention to provide a motor which is capable of producing a comparatively high locking or holding effect at zero speed.

It is a further object of this invention to provide a rotor for an induction motor which is capable of performing in a normal manner under load conditions and which rotor is also capable of rapid deceleration and is capable of producing locking torque when the rotor is at a standstill if the rotor is properly controlled.

Another object of the invention is to provide an electric clutch having positive locking characteristics.

Another object of this invention is to provide a control circuit which rapidly stops a motor made according to this invention and which circuit automatically de-energizes all of the stator windings when the rotor of the motor comes to a stop.

Other objects and advantages reside in the construction of parts, the combination thereof and the mode of operation, as will become more apparent from the following description.

By placing a first single-phase winding in the slots of a stator in addition to the main running winding and arranging this single-phase winding so as to produce a greater number of poles than produced by the main winding, the de-energization of the main winding followed by the energization of the single-phase winding tends to very quickly reduce the speed of the motor. By placing a second single-phase winding 90 degrees out of phase with the first single-phase winding and shorting this second single-phase winding through a conductor, or a condenser, the second single-phase winding increases the braking effect of the first single-phase winding so that the combined effect of the two windings is to bring the motor to a rapid stop.

It has been found that if a motor is provided with a stator having such windings and is provided with a rotor in which some of the rotor bars have a given resistance and some of the rotor bars have a resistance greater or less than the given resistance, a locking effect is produced at zero speed while the braking windings are energized.

The difference in resistance among rotor bars may be obtained by using rotor bars made of different materials or by the use of the same material of different cross sectional areas among distributed conductor bars.

In the drawing, Figure 1 discloses a perspective view of a motor used in the motor control system, according to this invention, with parts of the motor broken away for purposes of illustration.

Figure 2 is a schematic circuit diagram showing a motor made according to this invention applied to a control circuit for normal operation, for rapid deceleration thereof, and for producing holding torques at zero speed.

Figure 3 is a diagram illustrating the arrangement of the rotor bars in a forty-one slot rotor made according to this invention.

Figure 4 is a schematic end view of a rotor provided with forty-one slots and made according to this invention.

Figure 5 illustrates a typical speed-torque curve illustrating the braking effects of a motor made according to this invention during energization of the braking winding.

Figure 6 is a diagrammatic view of a positive locking clutch made according to this invention.

Figure 7 is a side sectional view of a clutch made according to this invention.

Figure 8 is a speed-torque curve illustrative of the operation of a clutch of this invention.

Figure 9 is a schematic wiring diagram of the preferred modification of a control circuit of this invention.

Referring to the drawing in detail, a motor frame 10 supports a motor stator 12 and a motor rotor 14. The rotor 14 is provided with a shaft 16 journalled in antifriction bearings 18. The stator 12 is provided with a plurality of windings including a conventional three-phase running winding 20, a short-circuited winding 22, and a single-phase braking winding 24. The winding 20 is arranged to be connected to the power supply lines L–1, L–2 and L–3 by means of a conventional multipolar switch 26. The running winding 20 is shown as a Y connected winding, while it may be a delta connected winding or have any other type of connections.

When it is desired to start the motor, a starting switch 28 is closed energizing a solenoid 30 which closes the multipolar switch 26 in accordance with a conventional practice. Closing of movable contacts 32, 34 and 36 of the multipolar switch 26 energizes the three-phase running winding 20. The braking winding 24, in combination with the short circuited winding 22, forms a two-phase winding which is adapted to be directly placed in the same slots which are provided for the main stator winding 20. However, the arrangement of the braking winding 24 and the short circuited winding 22 within the slots of the stator 12 is such as to establish a field having a larger number of magnetic poles than the number of magnetic poles produced by the main stator winding 20. By virtue of this arrangement of the windings, it is obvious that the synchronous speed of the motor energized solely by the running winding 20 may be several times as great as the synchronous speed of the motor when energized solely through the braking winding 24. The result is that the switch over from the energization of the main running winding 20 to the energization of the braking winding 24 will immediately produce a deceleration in the speed of the rotor 14. The short circuited winding 22 is arranged within the slots of the stator 12 so as not to have any induced voltage during the time that current flows through the main running winding 20.

The control circuit shown in Figure 2 is so arranged that the braking winding 24 is never energized when the running winding 20 is energized, and vice versa. However, the instant that the switch 28 is opened, the braking winding 24 is energized for a predetermined period of time.

For purposes of illustration, a timer device 38 is shown for use in controlling a switch 40 which energizes the braking winding 24. The timer device 38 includes a solenoid 42 which is arranged in series with a timer control switch 44 which automatically energizes the solenoid 42 upon the closing of the switch 28. As illustrated, the switch 44 is operated by the solenoid 30 and is arranged to be closed when the motor is started and remains closed at all times until the switch 28 is opened, at which time the switch 44 de-energizes the solenoid 42 of the timer 38, which, in turn, de-energizes the switch 40 after a predetermined time delay.

For purposes of illustration, a conventional time delay switch is shown in which the time delay is provided by dash pot 50 which retards the opening of the switch 40. Naturally, other types of time switches may be used. It is noted that the solenoid 30 also operates a switch 52 which remains closed at all times when the solenoid 30 is de-energized. The switch 52 opens immediately when the solenoid 30 is energized so as to prevent the flow of current through the braking winding 24 when the running winding 20 is energized.

As indicated in Figure 2, the ends of the winding 22 are connected, one to the other, by means of a conductor. However, a condenser may be connected across the winding 22 for obtaining various results in the rate of deceleration of the rotor 14 when the braking winding 24 is energized. The current produced in the winding 22 opposes the field generated by the flux in the rotor which is established in response to the energization of the braking winding 24. If it were not for the current carried within the winding 22, the braking winding 24 would tend to keep the rotor 14 operating as a single-phase motor but at a reduced speed, which speed is dependent upon the number of poles established by the winding 24.

A conventional rotor used in the motor control above described comes to a complete stop and zero torque is produced by the rotor at zero speed of the rotor. It has been discovered that if a stator having a braking circuit, such as shown in Figure 2, is used and properly controlled, and if a rotor such as rotor 14 is provided with conductor bars, some of which bars have a given resistance and other of said bars have a resistance different from the given resistance, and if the rotor bars having different resistances are properly distributed among the slots of the rotor, a holding or locking effect is obtained by energization of the braking winding 24 when the rotor 14 is at zero speed. Also, in a rotor with such distributed conductor bars of unequal resistance, the braking action is more positive than with a conventional rotor as the rotor approaches zero speed.

The rotor 14 is shown in detail in Figures 3 and 4 as being provided with forty-one slots. A conductor bar is placed in each of the forty-one slots of the rotor 14 and joined to a pair of end rings in a conventional manner. The rotor slots may be longitudinally parallel with the shaft 16, or the rotor slots may be skewed.

In a rotor 14 constructed according to this invention, brass conductor bars and copper conductor bars are illustrated. Copper bars have a different resistance from brass bars of the same physical size. The invention is not limited to brass and copper bars in that bars formed of other material may be used. In the illustration shown in Figure 3, a table is shown in which the conductor slots of a forty-one slot rotor are numbered, and the material used in each current carrying conductor placed in each of the forty-one slots is shown, this table of Figure 3 sets forth the complete arrangement of the conductor bars according to the material of which each of the conductor bars is formed. The letter B refers to a brass conductor bar and the letter C refers to a copper conductor bar.

It is noted that two or three brass conductor bars are positioned within consecutive slots of the rotor 14 followed by a copper bar positioned within the next slot followed by two or three brass conductor bars. With such an arrangement of conductor bars in the rotor 14, it is found that when windings 24 and 22 are energized braking is applied as above described and during this energization, after the rotor 14 is at zero speed, a holding or locking effect is established within the rotor 14. This locking effect restrains the rotor from being rotated. This locking effect may be of a value equal to the rated full load torque of the motor, or may be of a value higher than the rated full load torque of the motor. In Figure 5 is shown a braking curve taken from test data of a typical motor made according to this invention. As shown in Figure 5, the locking effect at zero speed is greater than the full load torque of the motor.

In a motor having a forty-one slot rotor, as illustrated in Figures 3 and 4, a braking winding 24 which establishes eighteen poles is found to operate satisfactorily. However, a plurality of poles other than eighteen may also be satisfactory in either a forty-one slot rotor or in a rotor having more or fewer slots than forty-one. It is found that with a braking winding such as winding 24 there is a tendency for the copper bars or the bars of least resistance of the rotor to attempt to align themselves with the center portion of the poles established by the braking winding 24. A holding or locking torque at zero speed is thus obtained. The braking windings 24 and 22 thus become locking windings.

A locking device having a rotor and locking winding made according to this invention need not necessarily be rotated or brought to a stop by the circuit illustrated in Figure 3. Any suitable circuit or winding or windings may be used for rotation or deceleration of the motor while the rotor and the braking or locking windings of this invention are employed for locking the rotor against rotation, providing a locking device. Naturally, a motor or device capable of producing such a locking effect as herein described is used in a large number of applications.

As may be understood, an arrangement of conductor bars within a rotor of this invention is not limited to conductor bars of brass and copper. Rotor bars formed of three or more types of metals such as brass, copper, aluminum and other suitable conductor materials may be used and distributed in a predetermined arrangement throughout the slots of a rotor. Furthermore, conductor bar resistances in a given rotor may be such that a conductor bar of a given resistance may be positioned in a given slot with a bar of a greater resistance positioned in an adjacent slot on one side thereof and a bar of a lesser resistance in an adjacent slot on the other side thereof. In other words, conductor bars selected from any plurality of resistance groups may be distributed among the slots of a rotor according to a predetermined arrangement.

It has also been found that a positive locking clutch may be made according to the principles set forth in this invention.

This is a mechanism by which one rotatable member may drive a second rotatable member, the first rotatable member being constantly rotated while the second rotatable member is intermittently driven by the first rotatable member.

For purposes of illustration a clutch made according to this invention is indicated generally by reference numeral 54 and is shown in Figures 6 and 7. The clutch 54 is provided with two independently rotatable shafts 60 and 62. The shaft 60 may be coupled to a driving member and a shaft 62 may be attached to a driven member or the shaft 60 may be coupled to a driven member and the shaft 62 to the driving member. An outer rotor 64, attached to the shaft 60, is rotatably supported in anti-friction bearings 66 and 68. An inner rotor 70 is attached to the shaft 62 and is rotatably supported in anti-friction bearings 72 and 74. Bearing 68 is a double bearing and is supported by the shaft 62 and the bearing 72 is supported within the outer rotor member 64, as shown in Figure 7. The bearings 66 and 74 are supported by bearing pedestal members 76 and 78.

The outer rotor member 64 is provided with a pair of windings 80 and 82. These windings 80 and 82 are electrically displaced 90 degrees and are similar to the windings 22 and 24 shown in Figure 2. Winding 80 is a shorted winding and winding 82 is an energizing winding. The outer rotor member 64 is similar to a conventional stator; however, due to the fact that it is rotatably mounted, it is herein termed the outer rotor. The inner rotor member 70 may be similar to a conventional induction motor rotor, except that, as is disclosed in Figure 6, conductor bars are only provided around a portion of the periphery. The conductor bars are herein shown as conductor bars 84. The conductor bars 84 are positioned in groups, each group having an equal number of conductor bars and the groups being spaced substantially an equal distance apart around the periphery of the inner rotor 70. The groups of rotor conductor bars 84 are herein shown as having four conductor bars 84 in each group. However, any suitable number of conductor bars might be used. It is noted that the number of conductor bar groups is equal to the number of poles of the energizing winding 82; however, satisfactory operation may be obtained using a number of groups of bars different from the number of magnetic poles. Electrical energy for energizing the winding 82 is provided through a pair of slip rings 88. The slip rings 88 are shown positioned on the shaft 60 beyond the bearing 66. However, the slip rings may be positioned on the shaft 60 between the bearing 66 and the outer rotor member 64. Wires 89 connect from the slip rings 88 to the winding 82.

As stated above, either the shaft 60 or the shaft 62 may be connected to a driving member while the other shaft is connected to a driven member. When it is desired to "clutch in" to drive the driven member at the speed of the driving member, a single phase alternating current voltage is supplied to the slip rings 88 which energizes the energizing winding 82. When this energization occurs, voltage is induced in the shorted winding 80 which causes the outer rotor 64 and inner rotor 70 to approach the same speed and the energizing winding 82 causes the groups of conductor bars 84 to align themselves between the magnetic poles established by the energizing winding 82. The inner rotor member 70 is thus electrically locked with the outer rotor member 64 and the locking position is as shown in Figure 6, in which each of the groups of conductor bars 84 is positioned between two adjacent magnetic poles of the energizing winding 82. The speed of a driven member attached to one of the shafts thus becomes equal to the speed of the driving member attached to the other shaft.

Figure 8 shows a speed torque curve 90 illustrating the operation of a typical positive locking clutch made according to this invention. It is noted in Figure 8 that, as the speed of the outer rotor member with respect to the speed of the inner rotor member approaches zero, the torque between the outer rotor member 64 and the inner rotor member 70 increases. The exact shape of such a curve is determined by various factors, among which are the arrangement and resistances of the rotor conductor bars. Naturally, it is understood that when the speed of the outer rotor member with respect to the speed of the inner rotor member is zero, the inner rotor member is rotating at the same speed as the outer rotor member. When it is desired to release the driven member from clutched engagement with the driving member, all that is necessary is to de-energize the energizing winding 82 by removal of the voltage applied across slip rings 88.

All of the conductor bars 84 may be made of the same material and of an equal physical size so that the electrical resistance of each of the conductor bars 84 is of the same value, or conductor bars having different electrical resistances may be grouped in a rotor made according to this invention.

A preferred modification in a control circuit for a motor made according to this invention is shown in Figure 9. Such a circuit causes a motor of this invention to quickly decelerate and stop, and also automatically causes the braking winding to be de-energized at the instant that the rotor of the motor comes to a stop. As shown in Figure 9, a three-phase stator winding 100 provides a revolving field for rotation of a rotor 102. A braking winding 104 and a short circuited winding 106 are also provided in the same stator as the three-phase winding 100. The stator winding 100 is similar to the stator winding 20 shown in Figure 2, and the rotor 102 is similar to the rotor 14; the shorted winding 106 is similar to the shorted winding 22, and the braking winding 104 is similar to the braking winding 24 of Figure 2. The rotor 102 is provided with a plurality of rotor conductor bars 108 which are of various resistances and which are distributed according to a given arrangement in a manner such as described above with respect to rotor 14 or in any other suitable arrangement.

A starter 110 is conected for the energization of the stator winding 100 from power supply lines L–1, L–2 and L–3. When a start button 116 is depressed, a pick-up coil 114 is energized from the lines L–2 and L–3. When the coil 114 is energized, the starter 110 operates, which closes normally open switches 120, 122, 124 and 126, and which opens normally closed switch 128. The closing of switch 126 "seals in" the circuit to the line L–2 so that the start button 116 may be released and the pick-up coil 114 remains energized. The rotor 102 rotates as a result of the induced voltages resulting from the energization of the three-phase winding 100. As discussed above, there is no induced voltage produced across the shorted winding of this invention by the main winding. The shorted winding 106 is so wound that there is no voltage produced between ends 130 and 132 thereof, but there is a voltage produced across portions of the shorted winding 106. Due to the fact that a voltage is produced across portions of the shorted winding 106, a voltage may be obtained between various locations on the shorted winding 106. For example, there is a voltage from a point 134 of the winding 106 to the end 132 of the shorted winding 106. Conductor wires 135 connect from points 132 and 134 to an actuating coil 136 of a relay 138, which relay is also provided with a normally open switch 140. Thus, when the stator winding 100 is energized, the rotor 102 rotates and a voltage is produced across portions of the shorted winding 106 so that the actuating coil 136 closes the normally open switch 140.

Due to the fact that the normally closed contact 128 is opened during the energization of the stator winding 100, the braking winding 104 remains de-energized even though the normally open switch 140 is closed by the pick-up coil 136. However, when it is desired to stop rotation of the rotor 102, a stop button 142 is depressed opening the circuit which connects to the pick-up coil 114, thus de-energizing the coil 114. Therefore, the switches 120, 122 and 124 open, de-energizing the three-phase winding 100, and the switch 128 closes. The relay 138 has an inherent time delay drop-out characteristic of approximately two-tenths of a second. Therefore, the switch 140 does not open when the stator winding 100 is de-energized. When the normally closed contact 128 closes after the de-energization of the pick-up coil 114, a voltage is applied from lines L–2 and L–3 across the braking winding 104. Thus, voltage is again applied to the coil 136 holding the switch 140 closed with the result that the braking winding 104 causes rapid deceleration of the rotor 102, and the shorted winding 106 causes the rotor 102 to come to a complete stop very quickly. When the rotor 102 reaches zero speed, there is no voltage induced in the shorted winding 106 by rotation of the rotor 102. Therefore, there is no voltage across any portion of the shorted winding 106, and the switch 140 opens as a result of the de-energization of the actuating coil 136. When the contact 140 opens, the braking winding 104 is de-energized. Consequently, there is no voltage applied to any of the stator windings and the motor is completely de-energized. Thus, it may be understood that a circuit according to the principles set forth in Figure 9 causes the rotor 102 to stop rapidly when braking is desired and the circuit also causes automatic de-energization of the braking windings after the rotor stops.

Any device made according to this invention may be provided with a three-phase winding, as indicated by reference numerals 20 and 100 in Figures 2 and 9, or with any other polyphase winding, or with a single phase winding.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a motor, a stator, a rotor, a main stator winding arranged to establish a given number of poles, a brake winding arranged to establish a greater number of poles, first switch means for controlling the energization of said main winding, second switch means for controlling the energization of said brake winding, and means for opening said first switch means and for closing said second switch means for braking the motor, the rotor comprising a plurality of brass conductor bars and copper conductor bars, there being a different number of brass bars from the number of copper bars, the number of copper bars being less than the number of poles established by the brake winding.

2. In a motor, a stator having a main winding arranged to establish a given number of magnetic poles, said stator having an auxiliary two-phase brake winding arranged to establish a number of poles in excess of said given number of poles of the main winding, means for shorting one phase of the brake winding, first switch means for controlling the energization of the main winding, second switch means for controlling the energization of the second phase of the auxiliary brake winding, means for opening the first switch means and for closing the second switch means for braking the motor, a rotor of the squirrel cage type, the rotor comprising a plurality of conductor bars having a given electrical resistance and a plurality of conductor bars having a lesser electrical resistance than the given resistance.

3. In an alternating current motor, a stator, said stator having a three-phase winding, a squirrel cage rotor, means for applying a locking effect to said rotor comprising a first single-phase auxiliary winding wound upon the stator, a second single-phase auxiliary winding wound upon the stator and arranged in non-inductive relationship to said three-phase winding, means for shorting said second single-phase auxiliary winding, said second auxiliary winding being arranged electrically out of phase with respect to said first auxiliary winding, said squirrel cage rotor comprising a plurality of conductor bars having a given electrical resistance, and a plurality of rotor conductor bars having a greater electrical resistance.

4. In a motor, a stator, the stator having a main winding arranged to establish a given number of magnetic poles, an auxiliary two-phase winding arranged on said stator so as to establish a number of magnetic poles in excess of said given number, first switch means for controlling the energization of said main winding, second switch means for controlling the energization of one phase of said auxiliary winding, means for shorting the other phase of said auxiliary winding, and a rotor, the rotor being provided with a plurality of conductor bars, some of the conductor bars having a given resistance and other conductor bars of said rotor having a resistance different from the given resistance.

5. An electrical device for providing rotative energy to a load attached to said device and for holding the load against rotation, comprising a stator having a cylindrical bore, a rotor rotatable within the bore of said stator, the rotor being provided with a shaft for connection to a load, a first stator winding arranged to establish a given number of magnetic poles, a second stator winding arranged to establish a number of poles different from the number of poles established by the first stator winding, a third stator winding noninductively wound with respect to said first stator winding, the third stator winding being arranged substantially 90 electrical degrees out of phase with respect to said second stator winding, means for connecting one end of the third stator winding to the other end of the third stator winding, means for energization of the first stator winding, means for energization of the second stator winding and for de-energization of the first stator winding, the rotor being provided with a plurality of slots adjacent the periphery thereof, a current carrying conductor in each of said slots, some of the current carrying conductors having a given resistance and some of the current carrying conductors having a greater resistance than the given resistance.

6. In a motor, a stator, a squirrel cage rotor, said stator having a main running winding for energizing the motor, the stator also being provided with a first auxiliary winding and a second auxiliary winding, the second auxiliary winding being arranged in noninductive relationship to said main running winding of the stator, means for shorting said second auxiliary winding, said rotor including a plurality of conductor bars, some of said conductor bars having a greater resistance and some of said conductor bars having a lesser resistance.

7. A locking device comprising a rotor, a plurality of conductor bars positioned longitudinally within the rotor, some of the conductor bars having a given electrical resistance and some of the bars having an electrical resistance different from the value of the given electrical resistance, a stator, a first stator winding, a second stator winding disposed electrically out of phase with respect to the first stator winding, means for shorting the second stator winding.

8. A locking device comprising a rotor provided with a plurality of longitudinal slots disposed in annular relationship adjacent the periphery of the rotor, a plurality of conductor bas, there being one conductor bar positioned in each of the slots of the rotor, there being a plurality of the conductor bars having a given electrical resistance and positioned in distributed slots, the conductor bars positioned in the other slots being of a different resistance from the value of the given electrical resistance, a stator, a two-phase stator winding, means for energization of the first phase of said two-phase winding and means for shorting the second phase of said two-phase winding.

9. In a motor, a stator, a rotor, a main stator winding arranged to establish a given number of poles, a brake winding arranged to establish a different number of poles, first switch means for controlling the energization of said main winding, second switch means for controlling the energization of said brake winding, and means for opening said first switch means and for closing said second switch means for braking the motor, the rotor comprising a plurality of brass conductor bars and copper conductor bars, there being a different number of brass bars from the number of copper bars, the number of copper bars being equal to the number of poles established by the braking winding.

10. In a motor, a stator, a rotor, the rotor comprising a plurality of conductor bars having a given resistance and a plurality of conductor bars having a resistance different from the given resistance, a main stator winding arranged to establish a given number of poles, a brake winding arranged to establish a different number of poles, first switch means for controlling the energization of said main winding, second switch means for controlling the energization of said brake winding, means for opening said first switch means and for closing said second switch means for energizing said brake winding for stopping the rotor, and means for de-energizing said brake winding when the rotor comes to a stop.

11. In an alternating current motor, a stator having a main winding arranged to establish a given number of poles, said stator also being provided with a two-phase braking winding arranged to establish a number of poles in excess of said given number of poles of the main winding, one phase of the braking winding being shorted, a rotor of the squirrel cage type, the rotor comprising a plurality of conductor bars having a given electrical resistance and a plurality of conductor bars having a greater electrical resistance than the given resistance, first switch means for controlling energization of the main winding, second switch means for controlling energization of the second phase of the braking winding for stopping the rotor, and means connected to the shorted phase of the braking winding for de-energization the second phase of the braking winding when the rotor stops.

12. In an alternating current motor provided with a stator having a main winding arranged to establish a given number of poles, said stator also being provided with a two-phase braking winding arranged to establish a number of poles in excess of said given number of poles of the main winding, one phase of the braking winding being shorted, the motor being provided with a rotor of the squirrel cage type, the rotor comprising a plurality of conductor bars having a given electrical resistance and a plurality of conductor bars having a greater electrical resistance than the given resistance, first switch means for controlling energization of the main winding of the stator, second switch means for controlling energization of the second phase of the braking winding, means for opening said first switch means and for closing said second switch means for energizing the second phase of the braking winding for stopping the rotor, an actuating coil connected across a portion of the shorted phase of the braking winding, and switch means operable by said coil for de-energizing the second phase of the braking winding when the rotor stops.

13. In an alternating current motor provided with a stator having a main winding arranged to establish a given number of poles, said stator also being provided with a two-phase braking winding arranged to establish a number of poles in excess of said given number of poles of the main winding, one phase of the braking winding being shorted, the motor being provided with a rotor of the squirrel cage type, the rotor comprising a plurality of conductor bars having a given electrical resistance and a plurality of conductor bars having a greater electrical resistance than the given resistance, first switch means for controlling energization of the main winding of the stator, second switch means for controlling energization of the second phase of the braking winding, means for opening said first switch means and for closing said second switch means for energizing the second phase of the braking winding for stopping the rotor, an electro-magnetic type of relay having an actuating coil connected across a portion of the shorted phase of the braking winding, the relay also being provided with a normally open contact having time delay opening in the energization circuit of the second phase of the braking winding, the relay operating to de-energize the second phase of the braking winding when the rotor comes to a stop.

14. In a rotory device, an outer cylindrical member, an inner cylindrical member within the outer cylindrical member and concentric therewith, one cylindrical member being rotatable with respect to the other cylindrical member, one of said cylindrical members being provided with a two-phase winding, one phase of the two-phase winding being shorted, the other of said cylindrical members including a plurality of elongate conductor members therein, some of the conductor members having a resistance different from other conductor members.

15. In a rotary device, an outer cylindrical magnetizable member, an inner cylindrical magnetizable member within the outer cylindrical member and concentric therewith, one cylindrical member being rotatable with respect to the other cylindrical member, one of said cylindrical members being provided with a single-phase winding and a short circuited winding electrically displaced 90 degrees with respect to the single-phase winding, the other of said cylindrical members including a plurality of elongate conductor members embedded therein and extending axially therewith, some of the conductor members having a given resistance and the other conductor members having resistances different from the given resistance.

References Cited in the file of this patent

UNITED STATES PATENTS

| 1,079,332 | Fynn | Nov. 25, 1913 |
| 1,698,556 | Mortensen | Jan. 8, 1929 |
| 2,488,079 | De Lavaud et al. | Nov. 15, 1949 |
| 2,499,390 | Joy | Mar. 7, 1950 |
| 2,505,500 | Milde | Apr. 25, 1950 |
| 2,510,498 | Fuge | Jan. 6, 1950 |
| 2,627,059 | Noodleman | Jan. 27, 1953 |

FOREIGN PATENTS

| 359,207 | Great Britain | Jan. 27, 1953 |